(12) United States Patent
Levine et al.

(10) Patent No.: US 11,899,497 B1
(45) Date of Patent: Feb. 13, 2024

(54) ARTICLE MOUNTING APPARATUS AND SYSTEM COMPRISING SAME

(71) Applicant: XEBEC Inc., Austin, TX (US)

(72) Inventors: Alex Cole Levine, Austin, TX (US); Don Ba Chu, Austin, TX (US); Ethan James Garreau, Chattanooga, TN (US); Matthew Joel Quejada, San Francisco, CA (US)

(73) Assignee: XEBEC, Inc., Austin, TX (US)

( * ) Notice: Subject to any disclaimer, the term of this patent is extended or adjusted under 35 U.S.C. 154(b) by 0 days.

(21) Appl. No.: 18/328,725

(22) Filed: Jun. 3, 2023

(51) Int. Cl.
*G06F 1/16* (2006.01)

(52) U.S. Cl.
CPC .......... *G06F 1/1632* (2013.01); *G06F 1/1622* (2013.01); *G06F 1/1624* (2013.01)

(58) Field of Classification Search
CPC .... G06F 1/1622; G06F 1/1628; G06F 1/1632; G06F 1/1647; G06F 1/1649; G06F 1/1654; F16M 11/06; F16M 11/08; F16M 11/10; F16M 11/041; F16M 11/14
See application file for complete search history.

(56) References Cited

U.S. PATENT DOCUMENTS

| | | | |
|---|---|---|---|
| 1,936,558 | A | 11/1933 | Meyers |
| 5,035,392 | A | 7/1991 | Gross et al. |
| 5,768,096 | A | 6/1998 | Williams et al. |
| 6,151,401 | A | 11/2000 | Annaratone |
| 6,222,507 | B1 | 4/2001 | Gouko |
| D449,302 | S | 10/2001 | Jung |
| 6,302,612 | B1 | 10/2001 | Fowler et al. |
| 6,532,146 | B1 | 3/2003 | Duquette |
| 6,643,124 | B1 | 11/2003 | Wilk |
| 6,667,877 | B2 | 12/2003 | Duquette |
| 6,794,798 | B2 | 9/2004 | Watanabe et al. |
| 6,859,219 | B1 | 2/2005 | Sall |

(Continued)

FOREIGN PATENT DOCUMENTS

| | | |
|---|---|---|
| BE | 1024236 B9 | 2/2018 |
| CA | 189545 S | 12/2020 |

(Continued)

OTHER PUBLICATIONS

U.S. Appl. No. 29/865,807, filed Aug. 13, 2022, Levine.

(Continued)

*Primary Examiner* — Nidhi Thaker
(74) *Attorney, Agent, or Firm* — David O. Simmons; IVC Patent Agency

(57) ABSTRACT

An article mounting system comprises an article mounting apparatus and an article (e.g., accessory item) including a first article mount integral therewith. The article mounting apparatus comprises a main body and a first article attachment body. The first article attachment body is movably attached to the main body for enabling the first article attachment body to be moved between a first use position relative to the main body and a second use position relative to the main body. The first article attachment body includes set of retention members engageable with a set of mating retention members of the first article mount. Such engagement provides for the first article mount to be releasably retain in a selected one of a plurality of available mounting positions relative to the first article attachment body.

26 Claims, 12 Drawing Sheets

(56) References Cited

U.S. PATENT DOCUMENTS

| | | | |
|---|---|---|---|
| 6,967,632 B1 | 11/2005 | Minami et al. | |
| D534,214 S | 12/2006 | Marcy et al. | |
| 7,283,353 B1 | 10/2007 | Jordan et al. | |
| 7,375,954 B2 | 5/2008 | Yang | |
| D594,236 S | 6/2009 | Sidiropoulos | |
| D599,357 S | 9/2009 | Kaufman | |
| 7,633,744 B2 | 12/2009 | Kuhn | |
| D615,082 S | 5/2010 | Taichi | |
| 7,752,789 B2 | 7/2010 | Sun et al. | |
| 7,813,118 B2 * | 10/2010 | Burge | H04R 1/026 361/825 |
| D630,204 S | 1/2011 | Kovac | |
| D630,205 S | 1/2011 | Kovac | |
| D630,206 S | 1/2011 | Kovac | |
| D630,628 S | 1/2011 | Kovac | |
| D634,745 S | 3/2011 | Park et al. | |
| 7,936,558 B2 | 5/2011 | Chang | |
| 8,018,715 B2 | 9/2011 | Chang | |
| D652,832 S | 1/2012 | Wu et al. | |
| 8,243,471 B2 | 8/2012 | Liang | |
| 8,317,146 B2 | 11/2012 | Jung et al. | |
| D679,707 S | 4/2013 | Aarrestad et al. | |
| D694,754 S | 12/2013 | Nakada | |
| 8,842,425 B2 | 9/2014 | Ryu | |
| 8,854,278 B2 * | 10/2014 | Parker | G06F 3/1431 348/794 |
| 9,312,907 B2 * | 4/2016 | Auchinleck | H05K 5/0086 |
| D761,800 S | 7/2016 | Muller | |
| 9,393,757 B2 | 7/2016 | Borchardt et al. | |
| 9,395,040 B1 * | 7/2016 | Shawver | F16M 13/02 |
| 9,395,757 B2 | 7/2016 | Relf | |
| 9,441,782 B2 * | 9/2016 | Funk | F16M 13/00 |
| D770,447 S | 11/2016 | Endo et al. | |
| D770,448 S | 11/2016 | Endo et al. | |
| 9,523,461 B2 | 12/2016 | Kuan et al. | |
| 9,568,952 B2 | 2/2017 | Matzke et al. | |
| 9,696,760 B1 | 7/2017 | Zhang | |
| D810,079 S | 2/2018 | Boesiger et al. | |
| 9,927,839 B2 | 3/2018 | Kummer et al. | |
| 10,082,832 B1 | 9/2018 | Wang et al. | |
| 10,168,739 B1 | 1/2019 | Chen | |
| D864,958 S | 10/2019 | Yüksek et al. | |
| 10,809,762 B1 | 10/2020 | Levine | |
| 10,810,570 B1 * | 10/2020 | Martin | G06F 1/1607 |
| 10,817,020 B1 | 10/2020 | DeMaio | |
| 10,871,801 B2 | 12/2020 | Yao et al. | |
| D910,624 S | 2/2021 | Hudgins et al. | |
| 10,944,937 B2 | 3/2021 | Pei | |
| D920,975 S | 6/2021 | Yao et al. | |
| D938,436 S | 12/2021 | Gu | |
| 11,209,869 B2 | 12/2021 | Hudgins et al. | |
| D956,752 S | 7/2022 | Wang | |
| D960,887 S | 8/2022 | Levine | |
| D962,222 S | 8/2022 | Leung et al. | |
| 11,416,024 B2 | 8/2022 | Bryant et al. | |
| 11,573,596 B2 | 2/2023 | Levine | |
| 2005/0006331 A1 | 1/2005 | Engel | |
| 2005/0237699 A1 | 10/2005 | Carroll | |
| 2005/0253775 A1 | 11/2005 | Stewart | |
| 2006/0059751 A1 | 3/2006 | Chen et al. | |
| 2006/0082518 A1 | 4/2006 | Ram | |
| 2007/0247798 A1 | 10/2007 | Scott | |
| 2008/0198096 A1 | 8/2008 | Jung | |
| 2009/0102744 A1 | 4/2009 | Ram | |
| 2009/0201222 A1 | 8/2009 | Damian | |
| 2010/0039350 A1 | 2/2010 | Wakefield et al. | |
| 2010/0053027 A1 | 3/2010 | Tonnison et al. | |
| 2010/0124006 A1 | 5/2010 | Chang | |
| 2011/0019360 A1 | 1/2011 | Thabit | |
| 2011/0155868 A1 | 6/2011 | Sun et al. | |
| 2012/0223872 A1 | 9/2012 | Ram | |
| 2012/0280603 A1 | 11/2012 | Hsu et al. | |
| 2013/0077213 A1 * | 3/2013 | Kao | G06F 1/1628 361/679.01 |
| 2015/0212546 A1 | 7/2015 | Ram | |
| 2015/0378393 A1 | 12/2015 | Erad et al. | |
| 2016/0051019 A1 * | 2/2016 | Sirichai | H04B 1/3888 206/751 |
| 2016/0154434 A1 | 6/2016 | Lakhani | |
| 2016/0215926 A1 * | 7/2016 | Pollex | F16M 11/041 |
| 2016/0282905 A1 * | 9/2016 | Laine | H01R 13/22 |
| 2017/0003712 A1 | 1/2017 | Funk et al. | |
| 2019/0220059 A1 * | 7/2019 | Miles | H01R 13/6205 |
| 2020/0081483 A1 * | 3/2020 | Laurent | F16M 11/10 |
| 2020/0084902 A1 * | 3/2020 | Venkatesh | H05K 5/0217 |
| 2020/0278722 A1 | 9/2020 | Hudgins et al. | |
| 2020/0301481 A1 * | 9/2020 | Robinson | H04M 1/04 |
| 2021/0041915 A1 * | 2/2021 | Moser | G06F 1/1649 |
| 2021/0080999 A1 | 3/2021 | Bryant et al. | |
| 2021/0134130 A1 | 5/2021 | Kiani et al. | |
| 2021/0405702 A1 | 12/2021 | Hudgins et al. | |
| 2022/0075421 A1 | 3/2022 | Hudgins et al. | |
| 2022/0095466 A1 * | 3/2022 | Lee | H05K 5/0234 |
| 2023/0152846 A1 | 1/2023 | Levine | |
| 2023/0152847 A1 | 1/2023 | Levine | |

FOREIGN PATENT DOCUMENTS

| | | |
|---|---|---|
| CN | 206920985 U | 1/2018 |
| CN | 207529271 U | 6/2018 |
| CN | 304986389 | 1/2019 |
| CN | 305087700 S | 3/2019 |
| DE | 102007013565 A1 | 4/2008 |
| JP | 2010128105 A | 6/2010 |
| JP | 5077049 B2 | 11/2012 |

OTHER PUBLICATIONS

"DUEX", https://www.mobilepixels.us/products/duex as viewed Nov. 13, 2019, United States.

"Sidetrak", https://sidetrak.com as viewed Nov. 14, 2019, United States.

"Slidenjoy—Le Slide", https://yourslide.com as viewed Nov. 13, 2019, United States.

Cervantes, Edgar, "Here are the best Moto Mods available", May 14, 2021, https://www.androidauthority.com/moto-mods-789689/ (as visited May 22, 2023).

* cited by examiner

ARTICLE MOUNTING APPARATUS AND SYSTEM COMPRISING SAME

FIELD OF THE DISCLOSURE

The disclosures made in this Specification relate generally to article mounting apparatuses. More particularly, devices, systems, methods and apparatuses in accordance with embodiments of the disclosures made herein relate to enabling one or more articles such as, for example, in the form of an accessory item to be selectively mounted on a support article used by the user. In preferred embodiments, the support article is a consumer electronics device, and the articles are articles used in concert with the consumer electronics device.

BACKGROUND

Use of many types of apparatuses such as, for example, consumer electronics devices often require or benefit from related use of one or more accessory items (e.g., articles). Examples of such accessory items include, but are not limited to, devices such as visual displays, cameras, speakers, microphones, lights, and the like. In the case of consumer electronics, it is widely recognized that ergonomic placement and positioning of accessory items is highly desirable if not essential. Such ergonomic placement and positioning of accessory items is well known to be beneficial in that it improves user productivity and comfort.

Laptop computers are an example of a support article in the form of a consumer electronics device. It is well known that laptop computers have been a significant benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Additionally, it is often challenging to situate accessory items on or near a laptop in an ergonomic manner.

Therefore, devices, systems, methods and apparatuses that simplify and enhance the ergonomic placement and positioning of accessories relative to a support article in a manner that overcomes shortcomings associated with conventional article mounting approaches would be advantageous, desirable and useful. More specifically, in the case of a mobile computing device, there is a need to provide for ergonomic attachment of accessory items such as to, for example, increase available visual display area.

SUMMARY OF THE DISCLOSURE

Embodiments of the disclosures made herein are directed to devices, systems, apparatuses, and methods enabling one or more articles (e.g., accessory items" and the like) to be selectively mounted on a support article utilized by the user. Such devices, systems, apparatuses, and methods simplify and enhance the ergonomic placement and positioning of articles relative to a support article in a manner that overcomes shortcomings associated with conventional article mounting apparatuses. To this end, devices, systems, apparatuses, and methods in accordance with embodiments of the disclosures made herein enable one or more of a plurality of different types of articles to be selectively attached to a support article for enabling respective functionality(ies) of the one or more articles to be accessible by a user of the support article. For example, in the case of a laptop computer (i.e., a support article), an article mounting apparatus in accordance with embodiments of the disclosures made herein enables ergonomic attachment of one or more additional visual displays to the laptop for the purpose of increasing available visual display area.

In one or more embodiments of the disclosures made herein, an article mounting apparatus comprises a main body and an article attachment body movably attached to the main body. Such attachment enables the article attachment body to be moved between a first use position relative to the main body and a second use position spaced away from the first use position. The article attachment body includes at least one retention member engageable with at least one mating retention member of an article to releasably retain the article in a selected one of a plurality of available mounting positions relative to the article attachment body at an article engagement surface of the article attachment body.

In one or more embodiments of the disclosures made herein, an article mounting system comprises an article mounting apparatus and at least one of an article mount attachable to an article and an article including at least one article mount integral therewith. The article mounting apparatus comprises a main body and an article attachment body. The article attachment body is movably attached to the main body for enabling the article attachment body to be moved between a first use position relative to the main body and a second use position relative to the main body. The article attachment body includes at least one retention member engageable with at least one mating retention member of the article mount. Such engagement provides for the article mount to be releasably retain in a selected one of a plurality of available mounting positions relative to the article attachment body at an accessory item engagement surface of the article attachment body.

In one or more embodiments of the disclosures made herein, a device comprises a mounting assembly and a first accessory attachment body pivotably attached to the mounting assembly. The mounting assembly is engageable with a support article to retain the mounting assembly in a fixed position relative to the support article. The first accessory attachment body is pivotably attached to the mounting assembly. Such attachment enables the first accessory attachment body to be moved between a stowed position relative to the mounting assembly and a fully extended position relative to the mounting assembly. The first accessory attachment body includes a set of spaced-apart retention members engageable with a mating set of retention members of an accessory item. Such engagement provides for the accessory item to releasably retained in a selected one of a plurality of available mounting positions relative to the first accessory attachment body at an accessory item engagement surface of the first accessory attachment body. The first accessory attachment body includes an electrical connector integral therewith and accessible at the accessory item engagement surface of the first accessory attachment body. The electrical connector and the set of spaced-apart retention members are jointly configured for causing the electrical connector to become operably engaged with a mating connector of the accessory item when the set of spaced-apart retention members become engaged the mating set of retention members.

In some embodiments, each retention member of a set is spaced around a central point therebetween.

In some embodiments, each retention member of a set is angularly spaced away from each adjacent one of the retention members of the set by 90 degrees or 180 degrees.

In some embodiments, available mounting positions of a set of retention members are angularly located about a central point between all of the retention members.

In some embodiments, each of the retention members of a set has the same shape as each other retention members of the set.

In some embodiments, each of the retention members of a set is spaced away from the central point by the same distance.

In some embodiments, each of the retention members of a set is one of a magnet and a material subject to magnetic attraction by a magnet.

In some embodiments, the article attachment body overlays a rear surface of the main body when in a first use (e.g., stowed) position.

In some embodiments, the retention members of a set are engageable with mating retention members with the article attachment body in a first use position, a second use (e.g., fully retraced) position, and any position therebetween.

In some embodiments, the article attachment body includes an electrical connector integral therewith.

In some embodiments, the article attachment body includes an electrical connector integral therewith and accessible at the accessory item engagement surface of the article attachment body.

In some embodiments, the electrical connector and the retention members of a set (or singular retention member) are jointly configured for causing the electrical connector to become operably engaged with a mating electrical connector when the retention member(s) become engaged mating retention member(s).

In some embodiments, the electrical connector is located adjacent to retention members of an associated set or is located centrally between the retention members (e.g., centered on the central point).

These and other objects, embodiments, advantages and/or distinctions of the disclosed subject matter will become readily apparent upon further review of the following specification, associated drawings and appended claims.

DETAILED DESCRIPTION

Figure 1:
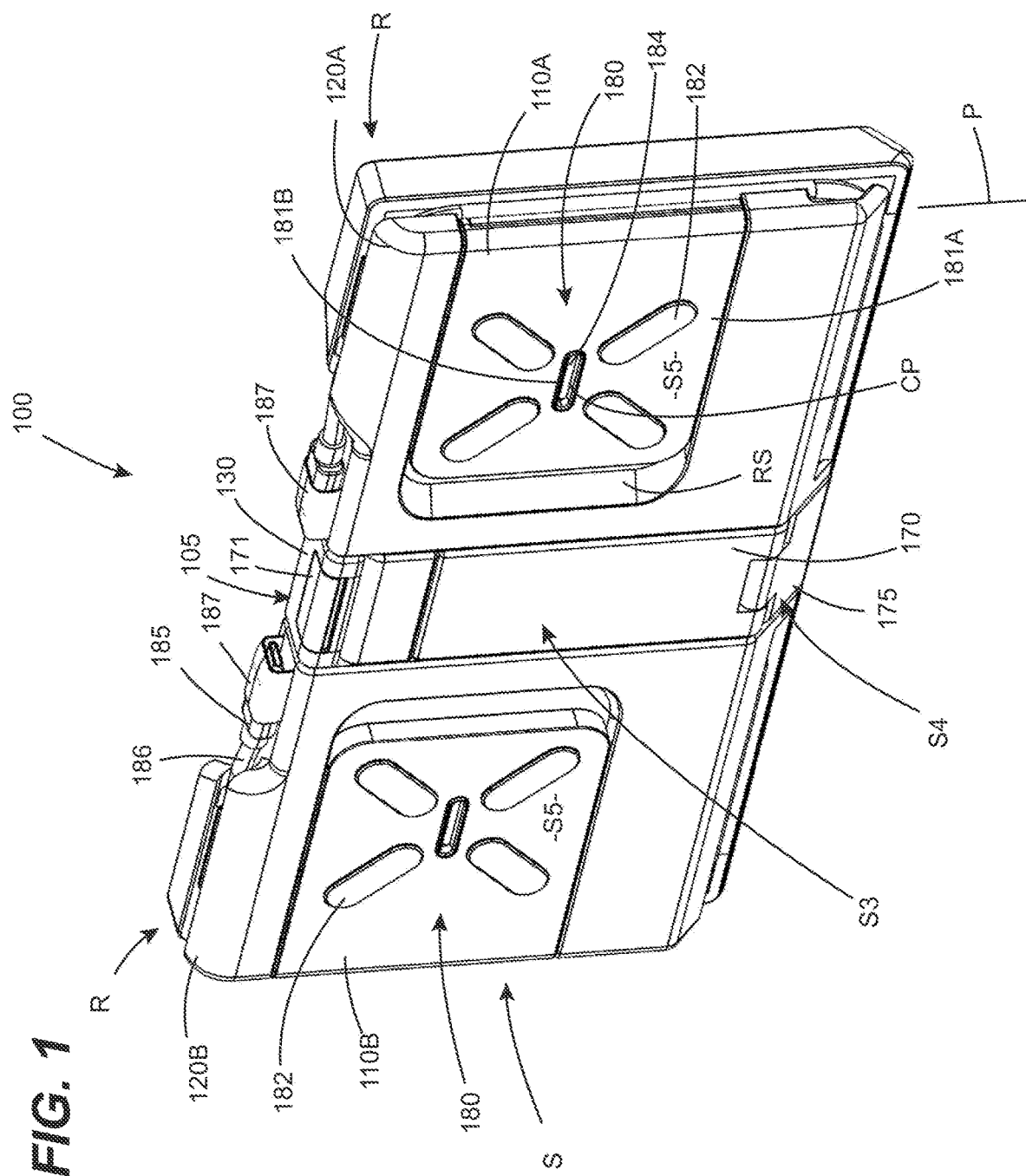
FIG. 1 is a rear perspective view of an article mounting apparatus in accordance with one or more embodiments of the disclosures made, wherein support article engagement bodies thereof are each in a respective fully retracted position and article mounting bodies thereof are each in a respective stowed position thereof.
Figure 2:
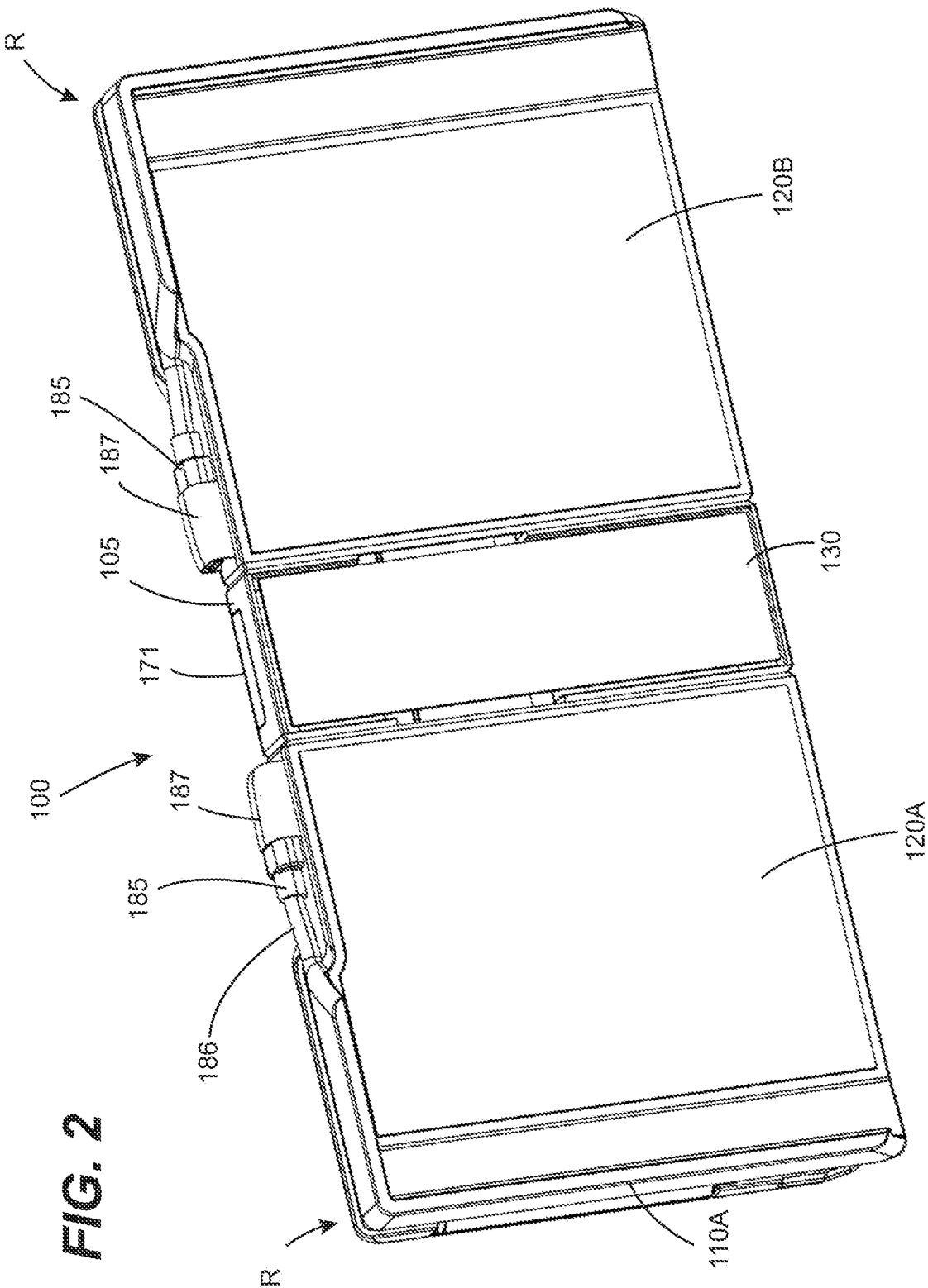
FIG. 2 is a front perspective view of the device of FIG. 1, wherein the support article engagement bodies thereof are each in a respective fully retracted position and the article mounting bodies thereof are each in a respective stowed position thereof.

As best shown in FIGS. 1-5, an article mounting apparatus in accordance with one or more embodiments of the disclosures made herein (i.e., the article mounting apparatus 100) is discussed. The article mounting apparatus 100 advantageously enables one or more articles (e.g., accessory items such as visual displays, cameras, speakers, microphones, illumination devices, cell phone, tablet, storage device, document holder, note board (e.g., whiteboard), cup holder, and the like) to be selectively mounted on a support article (e.g., a laptop, tablet, cell phone, monitor, television, illumination device, mirror, easel, and the like). Such selective mounting serves to simplify and enhance the ergonomic placement and positioning of articles relative to a support article in a manner that overcomes shortcomings associated with conventional article mounting apparatuses.

The article mounting apparatus 100 comprises a mounting assembly 105, a first accessory attachment body 110A, and a second accessory attachment body 110B. The mounting assembly 105 includes a first engagement body 120A, a second engagement body 120B, and a central body 130. The first engagement body 120A, the second engagement body 120B, and the central body 130 jointly define an embodiment of a main body that enables the article mounting apparatus 100 to be attached to a support article. It is disclosed herein that the main body 105 may be a one-piece structure or a multi-piece structure and that the central body 130 may be a one-piece structure or a multi-piece structure.

The first accessory attachment body 110A is moveably attached to the first engagement body 120A and the second accessory attachment body 110B is moveably attached to the second engagement body 120B for enabling each of the accessory attachment bodies 110A, 110B to be pivoted, relative to a respective one of the engagement bodies 120A, 120B, between a respective stowed position S (i.e., a first use position) and a respective fully extended position E (i.e., a second use position). In preferred embodiments, the accessory attachment bodies 110A, 110B are each pivotably attached to the respective one of the engagement bodies 120A, 120B. As discussed below in greater detail, each of the engagement bodies 120A, 120B are slidably (i.e., moveably) attached to central body 130 for enabling each of the engagement bodies 120A, 120B to be moved, relative to the central body 130, between a fully retracted position R and a fully displaced position D.

Figure 5:
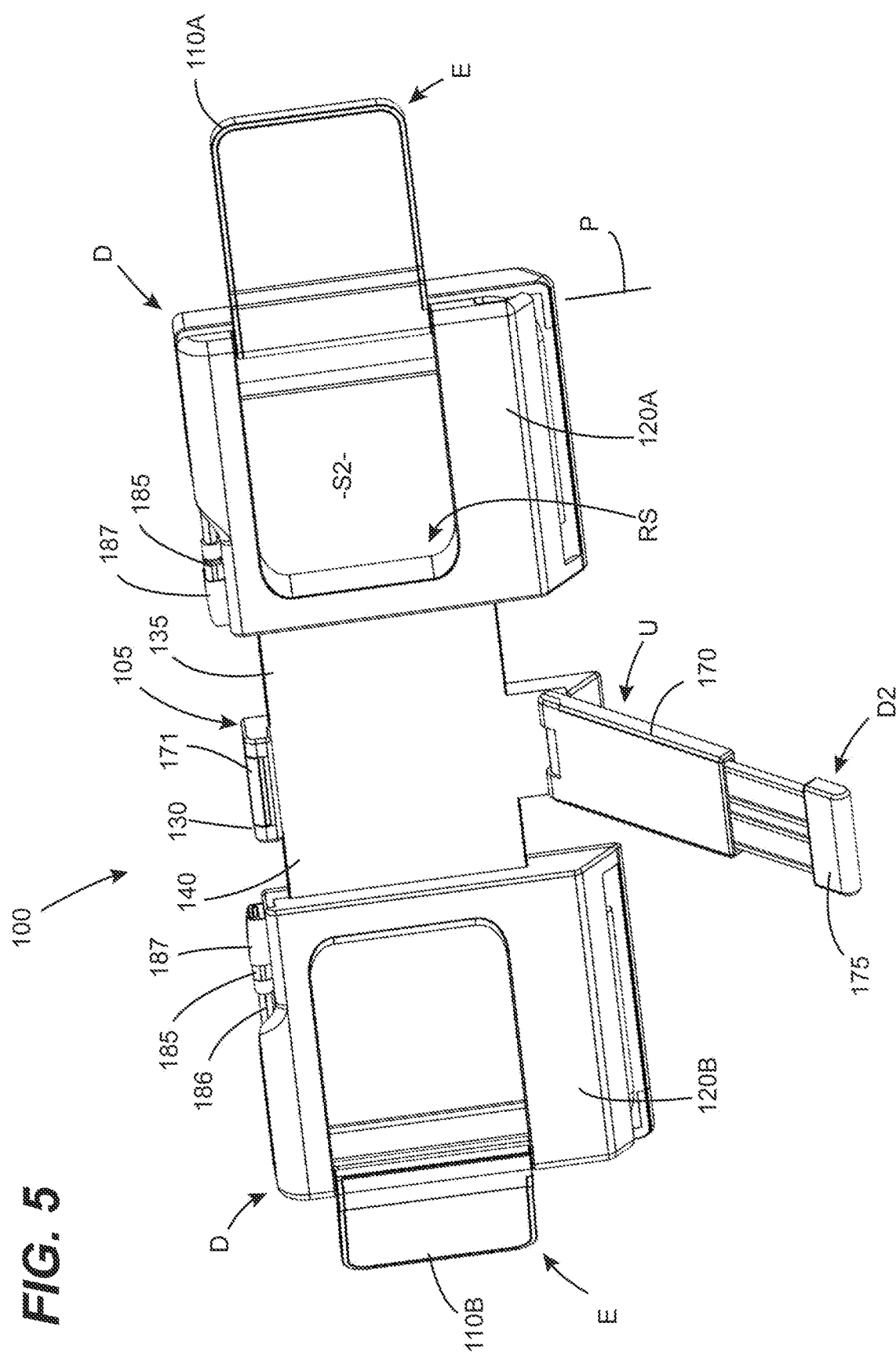
FIG. 5 is a rear perspective view of the device of FIG. 1, wherein the support article engagement bodies thereof are each in a respective displaced position, the article mounting bodies thereof are each in a respective extended position, and a main body thereof is in a deployed configuration.

The accessory attachment bodies 110A, 110B are each located at least adjacent to a rear surface of the respective one of the engagement bodies 120A, 120B when in the stowed position S. In preferred embodiments, as shown in FIGS. 1 and 5, the accessory attachment bodies 110A, 110B are each located within a recess space RS at the rear surface of the respective one of the engagement bodies 120A, 120B when in the stowed position S. Preferably, each of the accessory attachment bodies 110A, 110B is pivotably attached to the respective one of the engagement bodies 120A, 120B for enabling each of the accessory attachment bodies 110A, 110B to have a rear surface thereof generally parallel to (e.g., flush with) a rear surface of the respective one of the engagement bodies 120A, 120B when in the stowed position S and to pivot greater than 180 degrees from the stowed position S to the fully extended position E. For example, as shown in FIGS. 1 and 5, the location of a pivot axis P of each of the accessory attachment bodies 110A, 110B, the physical construct of each of the accessory attachment bodies 110A, 110B (e.g., thickness, edge radius/bevel, etc.), and the physical construct of the associated portions of the respective one of the engagement bodies 120A, 120B are jointly configured for enabling each of the accessory attachment bodies 110A, 110B to have a rear surface thereof generally flush with a rear surface of the respective one of the engagement bodies 120A, 120B when in the stowed position S and to pivot greater than 90 degrees from the stowed position S to the fully extended position E.

Although the article mounting apparatus 100 is depicted as having two accessory attachment bodies (i.e., accessory attachment bodies 110A, 110B), it is disclosed herein that an article mounting apparatus in accordance with embodiments of the disclosures made herein may have less than two accessory attachment bodies or more than two accessory attachment bodies. It is also disclosed herein that at least one article attachment body of an article mounting apparatus in accordance with embodiments of the disclosures made herein may have pivot about a pivot axis that extends in a skewed or perpendicular direction to the pivot axis P show in FIG. 1. It is further disclosed herein that at least one article attachment body of an article mounting apparatus in accordance with embodiments of the disclosures made herein may be incorporated in a fixed manner relative to a mounting assembly of the article mounting apparatus. Accordingly, an article mounting apparatus in accordance with embodiments of the disclosures made herein may have accessory attachment bodies along its top and/or bottom, individually or in combination with mounting members along one or both of its sides. It is further disclosed herein that at least one article attachment body of an article mounting apparatus in accordance with embodiments of the disclosures made herein may move between the stowed position and the fully extended position by using any suitable mechanism, including sliding, swiveling, etc.

Figure 4:
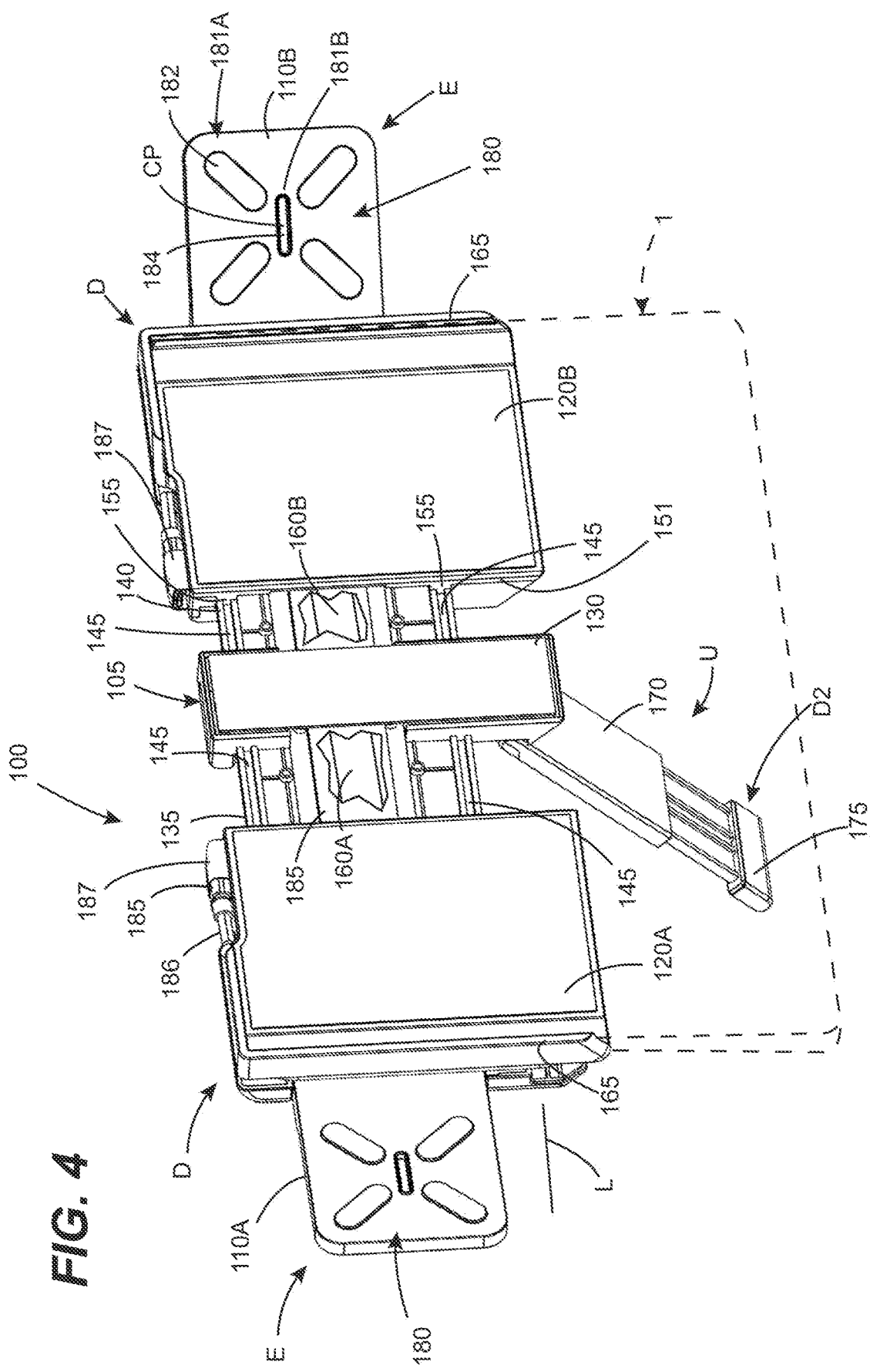
FIG. 4 is a front perspective view of the device of FIG. 1, wherein the support article engagement bodies thereof are each in a respective displaced position, the article mounting bodies thereof are each in a respective extended position, and a main body thereof is in a deployed configuration.
Figure 6:
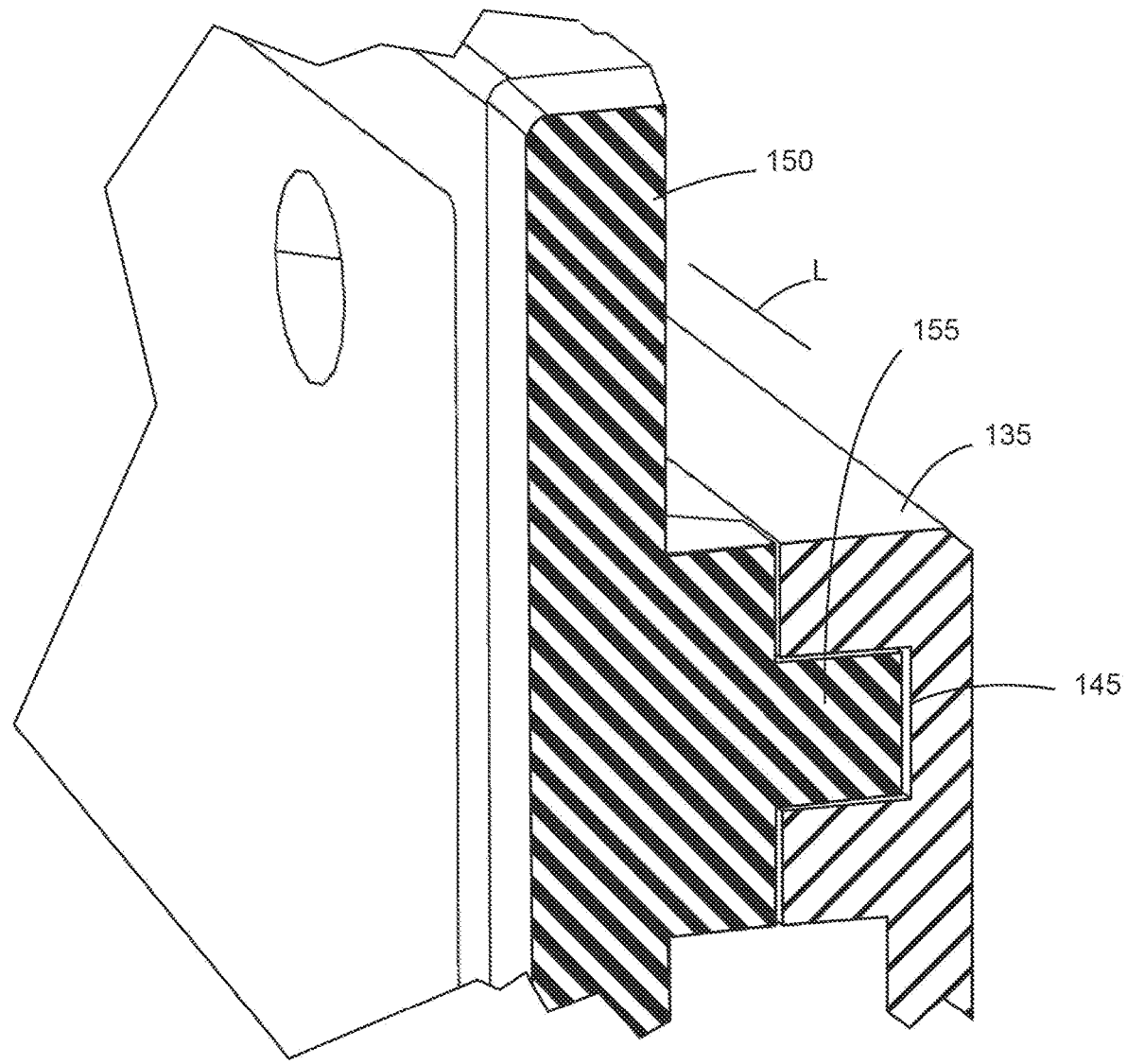
FIG. 6 is a fragmentary perspective view showing structural elements of the device of FIG. 1 enabling translation of each of the article mounting bodies relative to a mounting assembly of the device.

Referring now to FIGS. 4-6, a preferred embodiment of a construction of the mounting assembly 105 enables each of the engagement bodies 120A, 120B to be laterally translated relative to the central body 130 between the fully retracted position R and the fully displaced position D. To this end, the central body 130 includes opposing flanges 135, 140 that each have spaced apart channels 145 extending parallel to a longitudinal reference axis L. The longitudinal reference axis L may extend perpendicular to the pivot axis P of each of the accessory attachment bodies 110A, 110B. The engagement bodies 120A, 120B each include a frame 150, 151 (shown in FIGS. 4 and 6) having spaced apart shoulders 155 slidably seated within a respective one of the channels 145 to thereby enable each of the engagement bodies 120A, 120B to translate between the fully retracted position R and the fully displaced position D. The distance between the spaced apart channels 145, the physical construct of the spaced apart shoulders 155 (e.g., thickness, length, etc.), and the physical construct of the associated portions of the spaced apart channels 145 are jointly configured for enabling smooth translation of each of the engagement bodies 120A, 120B relative to the respective one of the flanges 135, 140 with negligible off-axis play.

The spaced apart channels 145 and the spaced apart shoulders 155 are one example of an engagement structure that enables each of the engagement bodies 120A, 120B to be laterally translated relative to the central body 130 between the fully retracted position R and the fully displaced position D. Each of the channels 145 is an example of a recessed engagement elements and each of the shoulders 155 is an example of a protruding engagement elements matingly and slidably engaged with a respective one of the recessed engagement elements. It is disclosed herein that any other suitable kind of engagement structure (e.g., a rail-like mechanism) that allows translation between to associated components may be used for enabling each of the engagement bodies 120A, 120B to be laterally translated relative to the central body 130 between the fully retracted position R and the fully displaced position D. Such other kinds of engagement structures may be interlocking or non-interlocking (i.e., secure the associated components together while permitting movement (e.g., longitudinal translation) therebetween).

Referring to FIGS. 4 and 6, the frame 150, 151 of each of the engagement bodies 120A, 120B is preferably coupled to the central body 130 by a respective one of a plurality of resilient members 160A, 160B (e.g., elastic band, spring or the like). The resilient members 160A, 160B may be located within a space between the respective one of the opposing flanges 135, 140 of the central body 130 and the respective one of the frames 150, 151. Each frame 150, 151 and thus the respective one of the engagement bodies 120A, 120B may be independently biased by the respective one of the resilient members 160A, 160B to the fully retracted position R. In some embodiments, a single resilient member may be coupled to both of the engagement bodies 120A, 120B and/or to the central body 130 for enabling the engagement bodies 120A, 120B to be independently biased by the resilient member to the fully retracted position R. In this manner, one or both engagement bodies 120A, 120B may be manually moved to or toward the fully displaced position D to permit a mating portion (e.g., visual display) of a support article 1 (e.g., cell phone, a tablet or laptop computer) to be placed between engagement members 165 of the engagement bodies 120A, 120B. Upon release of the engagement body(ies) 120A, 120B, they become forcibly biased toward the fully retracted position R thereby causing the engagement members 165 to exert retention force on opposing sides of mating portions (e.g., visual display) of the support article 1 to secure the article mounting apparatus 100 in a fixed position relative to the support article 1. As shown, the engagement members 165 may include a portion that extends along a top portion of the respective one of the engagement bodies 120A, 120B to thereby engage a mating portion of the support article 1 for maintaining vertical positioning between the mounting assembly 105 and the support article 1.

In some embodiments, the article mounting apparatus 100 may comprise a stabilizer 170 (i.e., commonly referred to as a "kickstand"). The stabilizer 170 is positionable to aid in maintaining the article mounting apparatus 100 and engaged support article 1 in a desired upright position. In preferred embodiments, as best shown in FIGS. 4 and 5, the stabilizer 170 may be pivotably or otherwise attached to the central body 130 for being moved between a stowed position S3 and a use position U. The stabilizer 170 may be secured in and selectively released from the stowed position S3 via a latch 171 or other suitable type of securement mechanism that is jointly engaged between the stabilizer 170 and the central body 130. The stabilizer 170 may include an extension member 175 that is movable between a stowed position S4 and a fully deployed position D2 to permit selective adjustment of a length of the stabilizer 170 relative to its length when in the stowed position S3. It is disclosed herein that, in some embodiments, the stabilizer 170 may be implemented in a fixed manner (e.g., an integral component of the central body 130 that does not offer rotational or translational movement relative to the central body 130). It is further disclosed herein that, in some embodiments, other support mechanisms may be used in place of the stabilizer 170, including, but not limited to, a stand, a movable arm, etc. In some embodiments, the stabilizer 170 may be removably attached via retention members that are configured to allow the stabilizer 170 to be optionally replaced with other support mechanisms.

Turning now to a discussion of accessory item interfacing and referencing FIGS. 1-5, each of the accessory attachment bodies 110A, 110B includes an accessory item interface 180 at an accessory item engagement surface S5. The accessory item interface 180 includes an attachment portion 181A and an interconnect portion 181B. The retention portion 181A comprises a plurality of the retention members 182 and the interconnect portion comprises an electrical connector 184. The retention members 182 enable an accessory item (i.e., article) to be attached to the respective one of the accessory attachment bodies 110A, 110B. The electrical connector 184 of the respective one of the accessory attachment bodies 110A, 110B enables an electrical interface for power, data signals, and the like to be established between electrical circuitry of the article mounting apparatus 100 and an accessory item (e.g., the accessory item 200) being attached to the article mounting apparatus 100 via the respective one of the accessory attachment bodies 110A, 110B.

Figure 3:
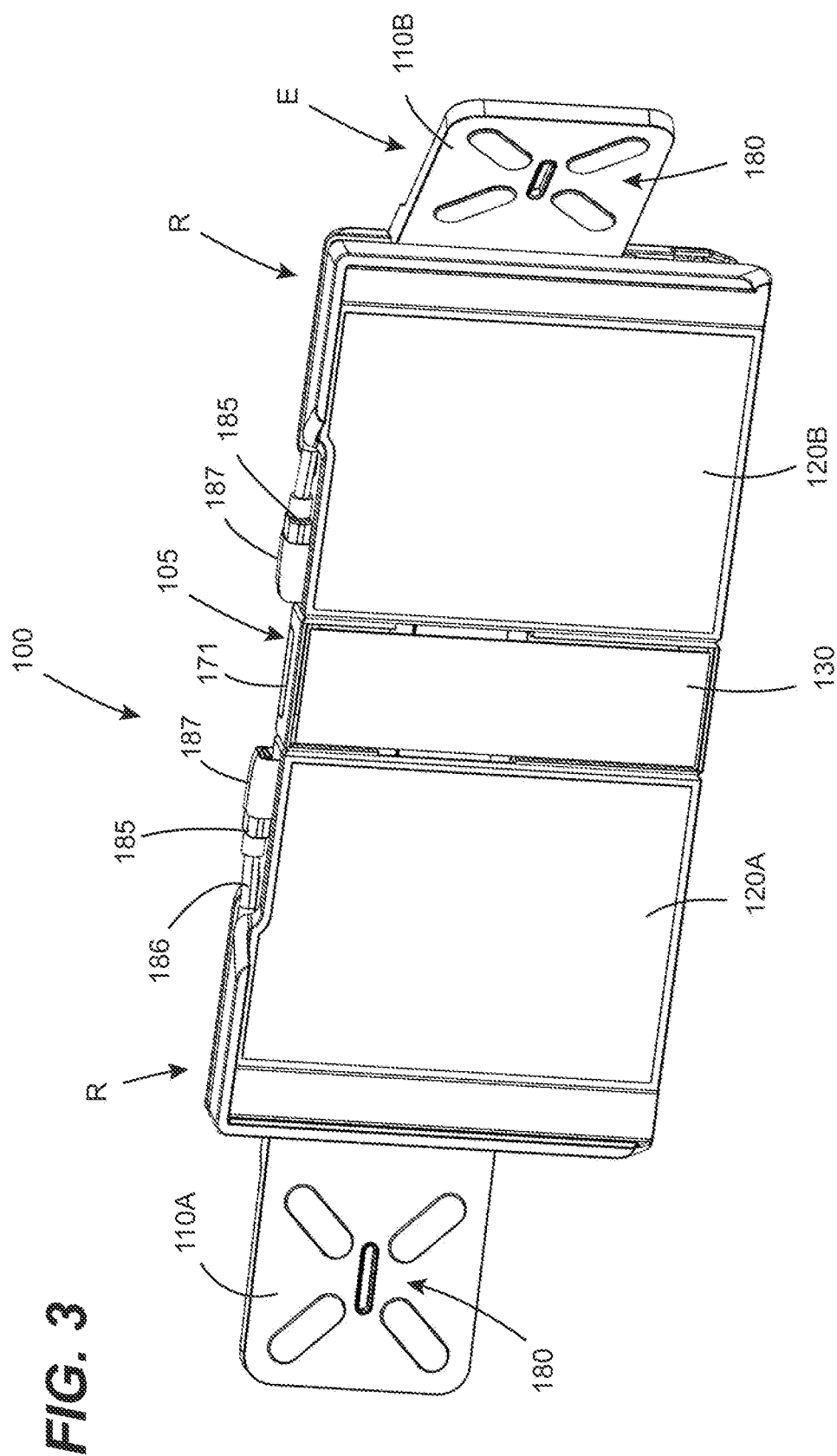
FIG. 3 is a front perspective view of the device of FIG. 1, wherein the support article engagement bodies thereof are each in a respective fully retracted position and the article mounting bodies thereof are each in a respective extended position.

The retention members 182 are preferably arranged as a set of spaced-apart retention members, as shown in FIGS. 1, 3, and 4). As discussed below in greater detail, such spaced-apart arrangement of the retention members 182 enables an accessory item (e.g., via a mating set of retention members thereof) to be releasably attached to the respective one of the accessory attachment bodies 110A, 110B in a selected one of a plurality of available mounting positions relative to the respective one of the accessory attachment bodies 110A, 110B. In preferred embodiments, the retention members 182 of a set are spaced (e.g., uniformly) around a central point CP between them, with each retention member 182 angularly spaced away from each adjacent one of the retention members 182 by one of 90 degrees and 180 degrees. Each of the retention members 182 of a set has the same shape as each other retention member 182 and is spaced away from the central point CP by the same distance.

As shown, each set of the retention members 182 is in a generally "X" shaped arrangement. It is disclosed herein that retention members of mounting devices in accordance with embodiment of the disclosures made are not limited to such an arrangement. The retention members and the mating retention members of an accessory item may be in the form of any suitable and functional construct that enables a mating set of retention members of an accessory item to be releasably engaged with the retention members of a respective one of the accessory attachment bodies to accommodate attachment of the accessory item in a selected one of a plurality of available mounting positions relative to the respective one of the accessory attachment bodies. For example, the retention members 182 may have a shape different than that depicted (e.g., have a shape that is round, rectangular, circular, etc.) and/or be arranged differently than depicted (e.g., be arranged as a single retention member in the shape of a ring, be arranged as a different number of retention members still uniformly spaced around a central point, be arranged in the shape of a polygon, be arranged to extend around a central point but not radiate outwardly therefrom, etc.).

In preferred embodiments, each of the retention members of a set may be made from a magnet or a material subject to magnetic attraction by a magnet with the mating retention member of the accessory item being made from the other of a material that exhibits magnetic attraction to a mating retention member of the accessory item. In some embodiments, retention members may be implemented in a non-magnetic manner such as, for example, hook and loop fasteners, mechanical quick-release (e.g., snap) fasteners, adhesive, one or more mechanical interconnect members, and the like.

Figure 7:
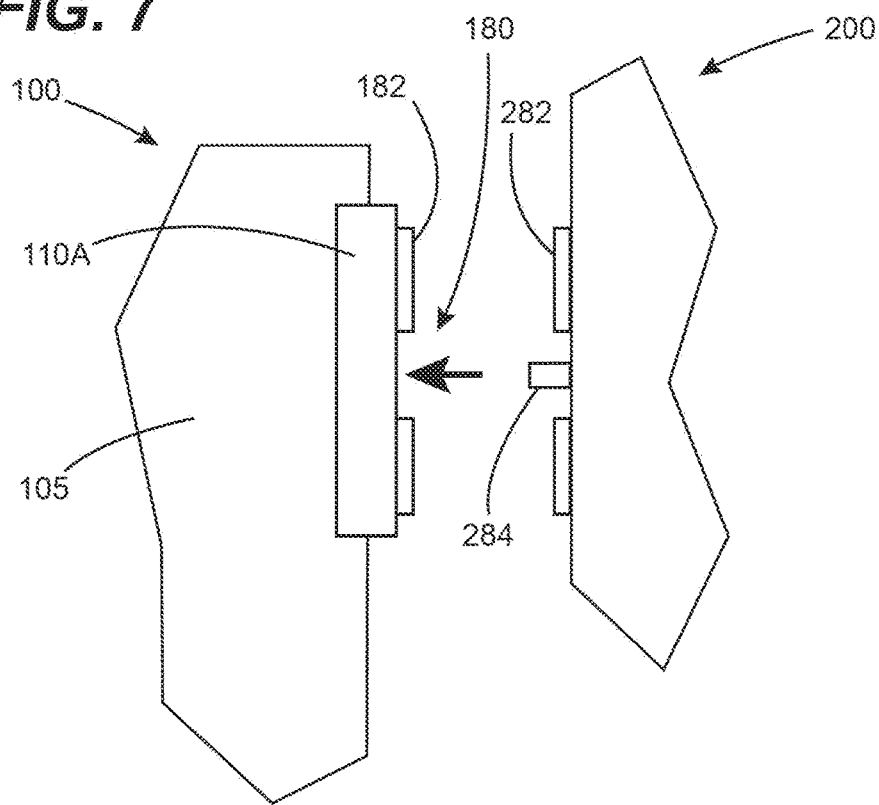
FIG. 7 is a diagrammatic view showing engagement of an article mounting apparatus in accordance with one or more embodiments of the disclosures made herein (e.g., the device of FIG. 1) with an accessory item in accordance with one or more embodiments of the disclosures made.
Figure 8:
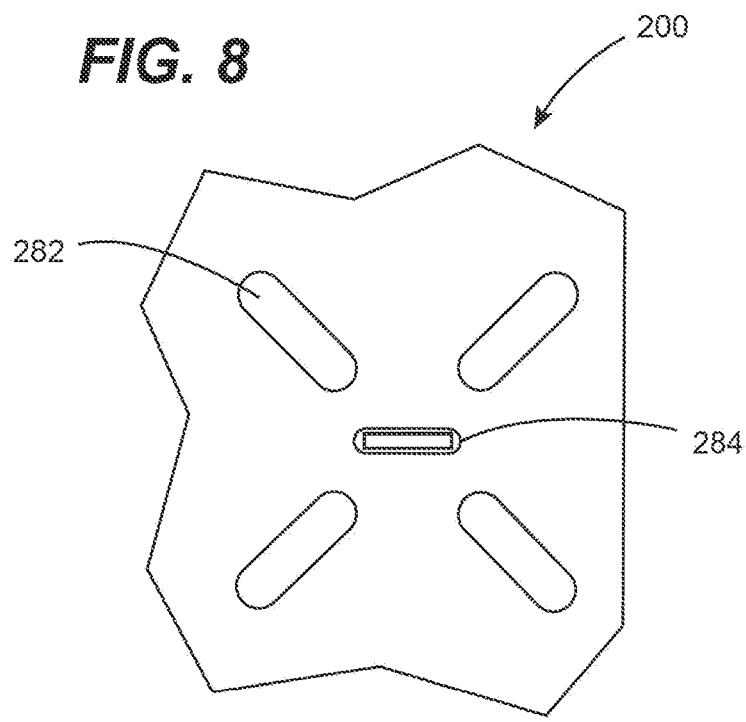
FIG. 8 is a fragmentary plan view of a mounting device interface of the accessory item of FIG. 7.
Figure 9:
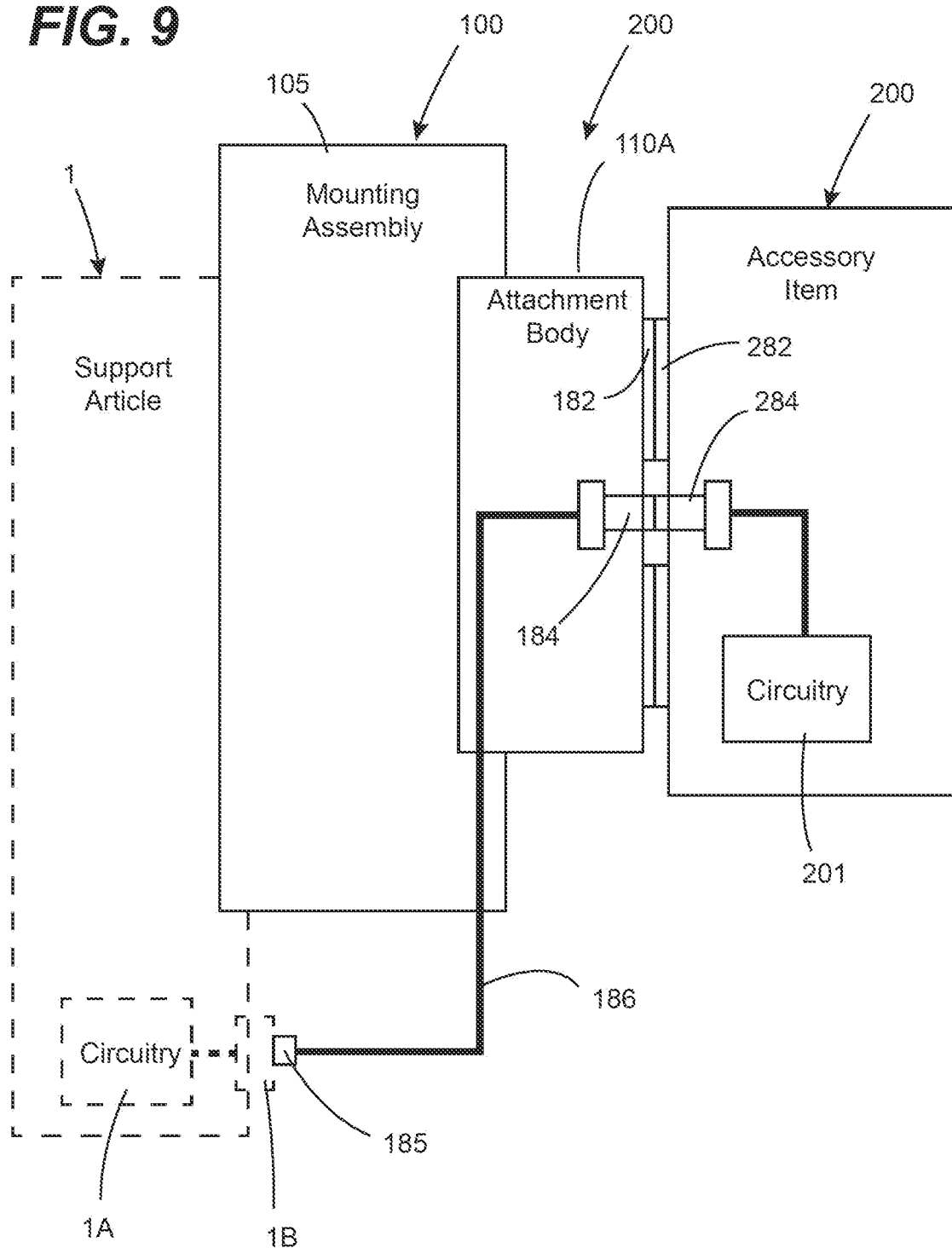
FIG. 9 is a diagrammatic view showing electrical interconnectivity and associated circuitry for components of an article mounting system in accordance with one or more embodiments of the disclosures made herein.

As shown in FIGS. 7-9, the retention members 182 and electrical connector 184 are jointly configured to provide for both structural attachment and electrical interconnection of the article mounting apparatus 100 to an accessory item 200. To this end, the retention members 182 of one of the accessory attachment bodies (e.g., accessory attachment body 110A, as shown) engage mating retention members 282 of the accessory item 200. The structural attachment serves the purpose of securing the accessory item 200 in a fixed position relative to the accessory attachment body 110A. In conjunction with such structural attachment, the electrical connector 184 of the accessory attachment body 110A may be provided to engage a mating electrical connector 284 of the accessory item 200 for providing an electrical interconnection. The electrical interconnection serves the purpose of permitting circuitry 201 of the accessory item 200 to be operably connected to circuitry 1A of the support article 1. The article mounting apparatus 100 and the accessory item 200 are an example of a system in accordance with one or more embodiments of the disclosures made herein.

As previously discussed, the electrical connector 184 of the accessory attachment body 110A and the electrical connector 284 of the accessory item 200 are jointly configured to engage each other for providing the electrical interconnection. It is disclosed herein that electrical interconnection between accessory items and article mounting apparatuses in accordance with embodiments of the disclosures made herein may be provide via any suitable type of mating electrical connectors that provide such electrical interconnection in response to structural attachment in accordance with embodiments of the disclosures made herein. As a skilled person will understand and appreciate, one particularly suitable type of electrical connectors suitable for providing electrical interconnection between accessory items and article mounting apparatuses in accordance with embodiments of the disclosures made herein are spring-loaded pin connectors often referred to as "POGO PIN" connectors.

In preferred embodiments, the article mounting apparatus 100 includes a distal electrical connector 185 that is connected to the electrical connector 184 of the respective accessory item interface 180 through a conductive member 186 such as, for example, a cable (See FIGS. 1-5). As shown in FIGS. 1-5, the distal electrical connector 185 may be stowed in a receptacle 187 of a respective one of the engagement bodies 120A, 120B. The distal connector 185 may be connected to a connector 1B of the support article 1 (e.g., a universal serial bus (USB) connector) for enabling power and/or signals (data, communications, and/or otherwise) to be provided between the support article 1 and the accessory item 200. Accordingly, in at least some embodiments, the electrical connector 184 of each accessory attachment body may be configured to accommodate USB power and signaling capabilities.

As best shown in FIG. 1, the electrical connector 184 is located centrally between the retention members on the central point CP. However, it is disclosed herein that the electrical connector 184 may be located adjacent to the retention members while not being located between the retention members (i.e., centrally, on the central point CP, or otherwise) or located in any position that facilitates engagement with the electrical connector 184 when the retention members are engaged with the mating retention members. It is also disclosed herein that, in some embodiments, article mounting apparatuses in accordance with the disclosures made herein may not include the connector 184. In such embodiments where an article mounting apparatus does not include the connector 184, a required electrical interconnection between an article support and an article being attached to the article support via the article mounting apparatus may be made directly between the article support and the article being attached to the article support via the article mounting apparatus (e.g., via a conventional USB cable).

Figure 10:
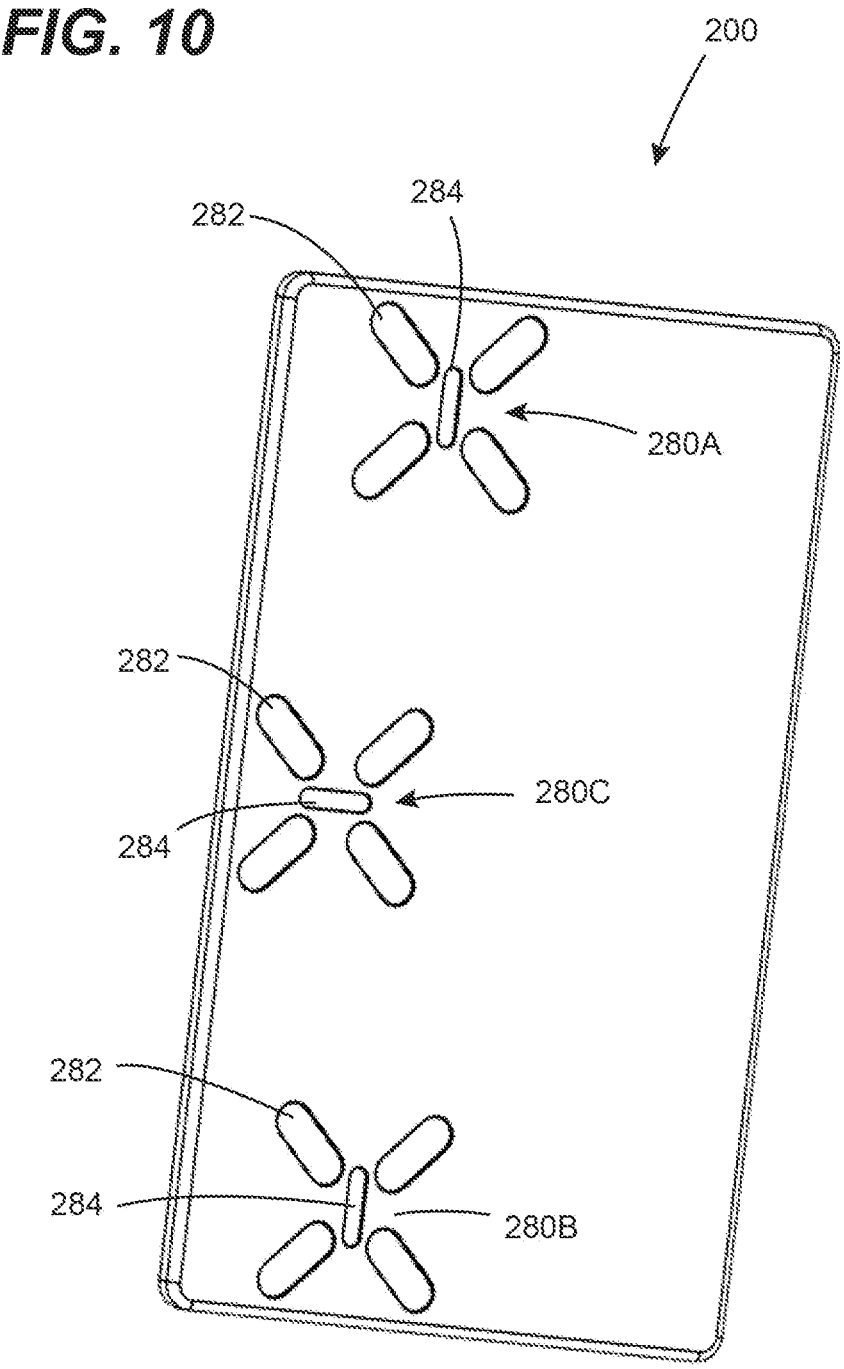
FIG. 10 is a rear perspective view of an accessory item in accordance with one or more embodiments of the disclosures made herein.
Figure 11:
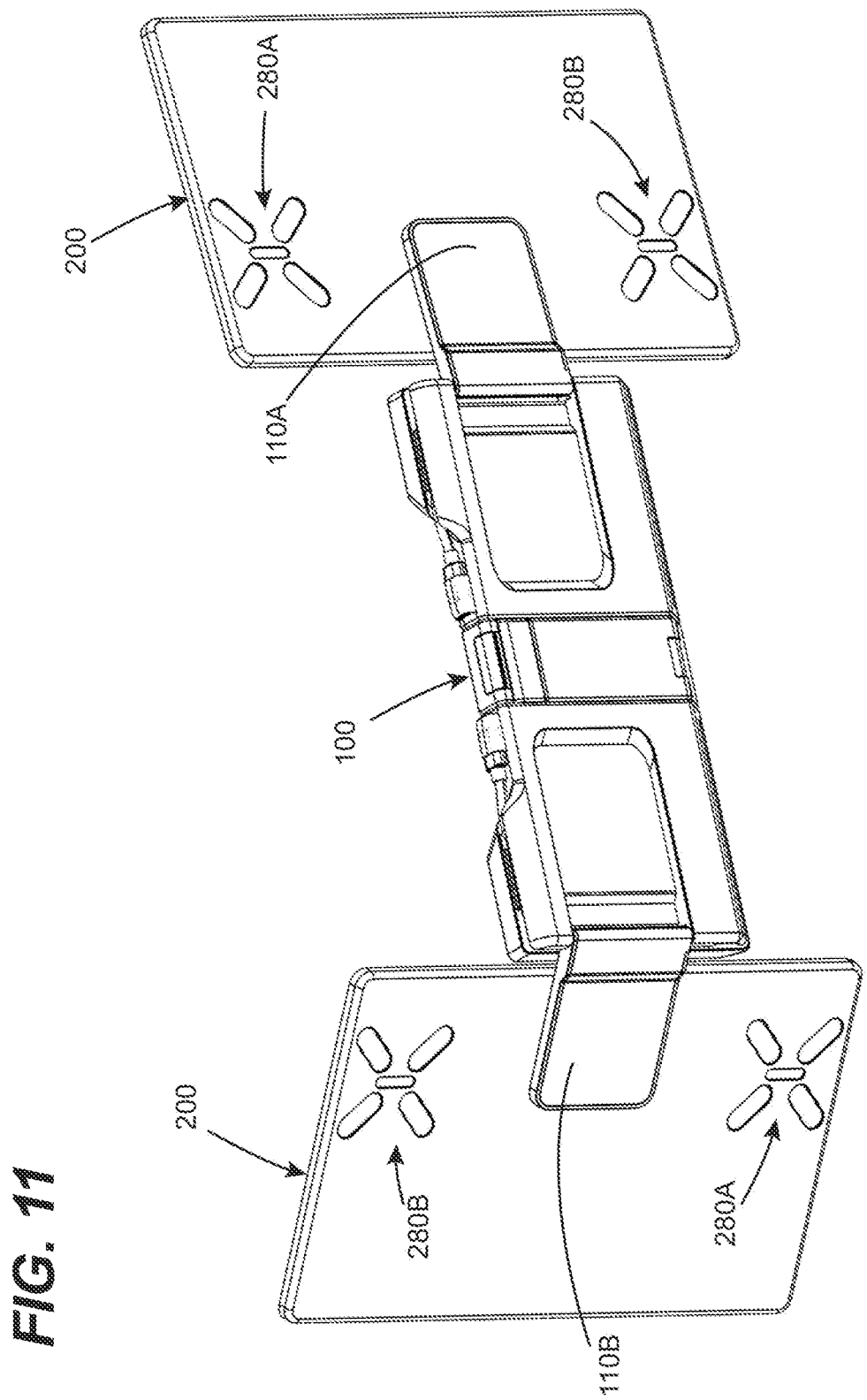
FIG. 11 is a rear perspective view of components of an article mounting system in accordance with one or more embodiments of the disclosures made with accessory items thereof attached to an article mounting apparatus thereof in a first arrangement.
Figure 12:
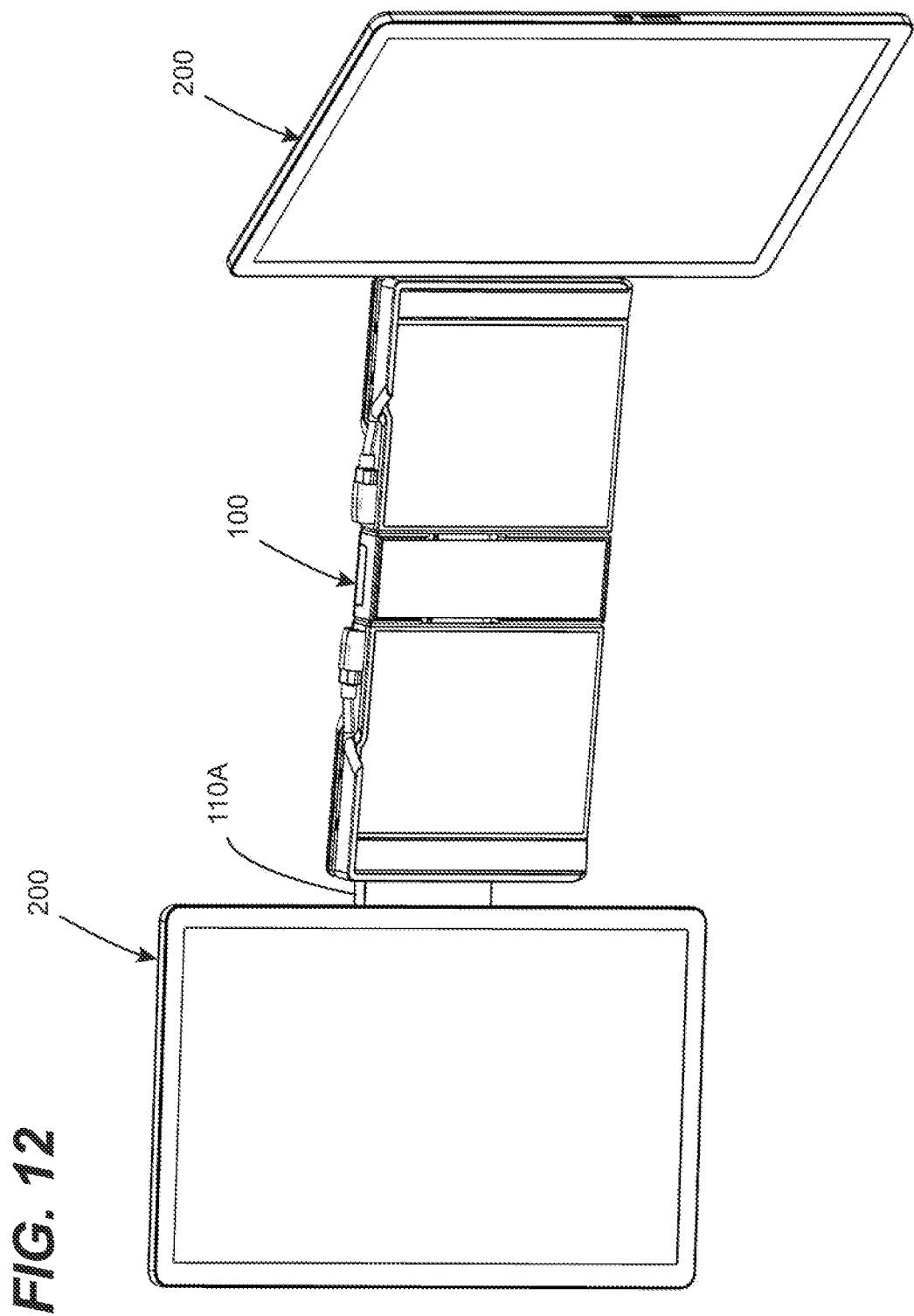
FIG. 12 is a front perspective view showing the components of the article mounting system of FIG. 11 with the accessory items thereof attached to the article mounting apparatus thereof in the first arrangement.
Figure 13:
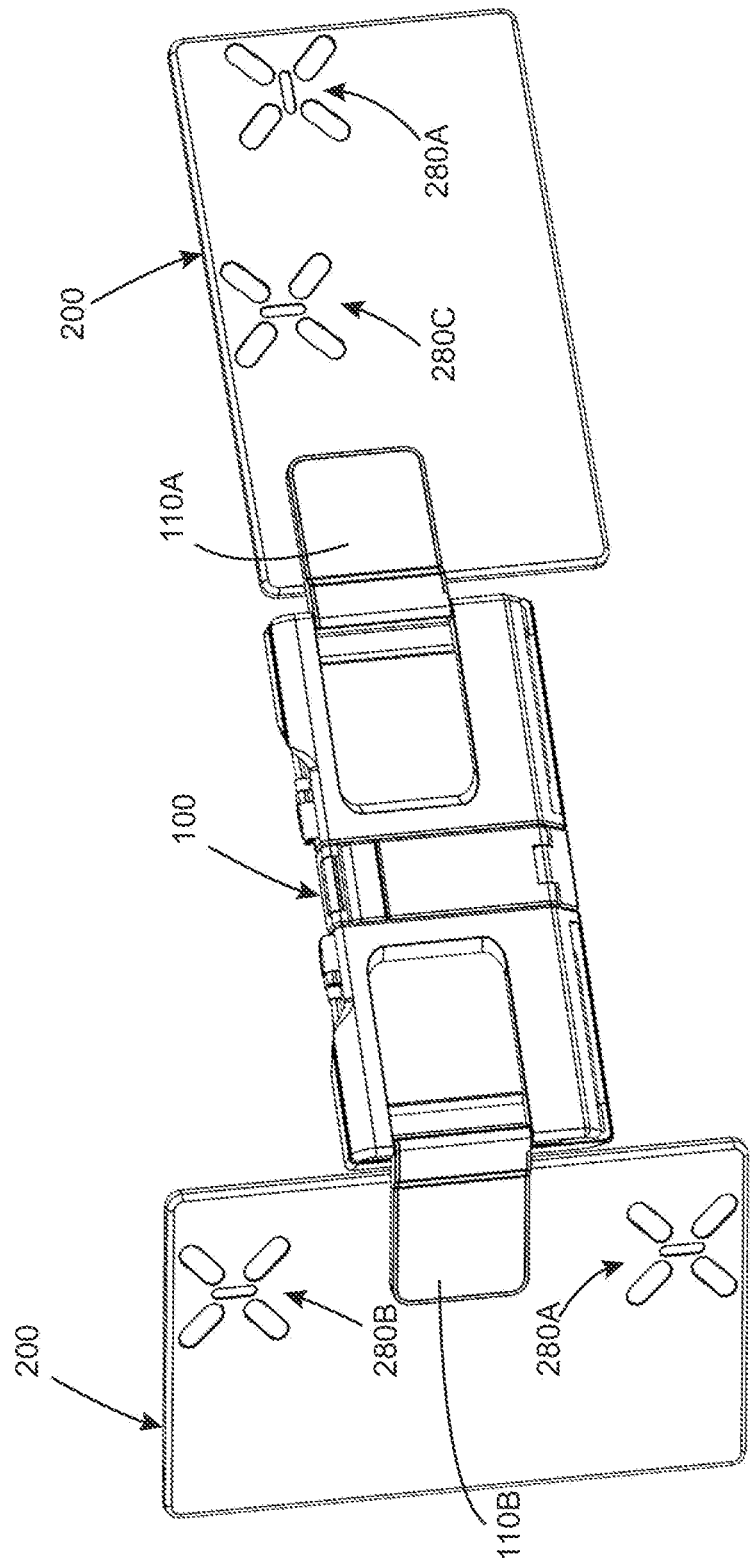
FIG. 13 is a rear perspective view showing the article mounting system of FIG. 11 with the accessory items thereof attached to the article mounting apparatus thereof in a second arrangement.

FIG. 10 shows the accessory item 200 with a plurality of mating mounting device interfaces 280A-280C. As discussed above, the mating mounting device interfaces 280A-280C each include retention members 282 that matingly engage the retention members 182 of the article mounting apparatus 100 and, optionally, electrical connector 284 that matingly engages the electrical connector 184 of one of the accessory attachment bodies 110A, 110B of the article mounting apparatus 100. Accordingly, each of the mating mounting device interfaces 280A-280C of the accessory item 200 has a construct that provides for structural and electrical engagement with the accessory item interface 180 of either one of the accessory attachment bodies 110A, 110B. Each of the mounting device interfaces 280A-280C defines a respective article mount that is integral with the accessory item 200. In some embodiments, the article mount may be a discrete structure that is attached to an accessory item via a suitable fastener, adhesive, mechanical/structural interface, or other form of article mount attachment means.

As shown in FIGS. 10-13, the mounting device interfaces 280A-280C are each located in a manner that permits the accessory item 200 to be attached to either of the accessory attachment bodies 110A, 110B in a respective one of a plurality of different angular positions (e.g., angularly spaced apart by 90 degrees or 180 degrees). For example, a first one of the mounting device interfaces (i.e., mounting device interface 208A) and a second one of the mounting device interfaces (i.e., mounting device interface 208B) are each positioned adjacent to a respective one of opposing ends of the accessory item 200, whereas a third one of the mounting device interfaces (i.e., mounting device interface 208C) is positioned adjacent to a side edge that extends between the opposing ends of the accessory item 200. As shown, such arrangement of the mounting device interfaces 280A-280C permits the accessory item 200 to be attached to either of the accessory attachment bodies 110A, 110B in both a portrait and a landscape format.

As shown above in FIGS. 1-5, the accessory attachment bodies 110A, 110B are each movable between the stowed position S to the fully extended position E. Beneficially, the accessory attachment bodies 110A, 110B (or at least one of them) and the mating attachment portion of an article are jointly configured for enabling the article to be attached to (or remain in attachment with) a respective one of the accessory attachment bodies 110A, 110B when the respective on of the accessory attachment bodies 110A, 110B is in the stowed position S. To this end, the accessory attachment bodies 110A, 110B and the mating mounting device interfaces 280A-280C of the accessory item 200 may be jointly configured to maintain a gap between opposing adjacent surfaces of the accessory item 200 and one of the engagement bodies 120A, 120B to which the accessory item 200 is attached. For example, the attachment portion 181A of the respective on of the accessory attachment bodies 110A, 110B may extend above (or at least be flush with) a rear surface for the corresponding one of the engagement bodies 120A, 120B.

It is disclosed herein that an attachment portion of each accessory attachment body of an article mounting apparatus in accordance with embodiments of the disclosures made herein and a mating attachment portion of each mounting device interface of an article in accordance with embodiments of the disclosures made herein may be jointly configured to employ mating mechanical structures. Such joint configuration enables structural interfacing of the article with the article mounting apparatus in a manner that accomplishes the same or generally the same relative placement and positioning of the articles relative to a support article as shown, for example, in FIGS. 11-13. In one example, the attachment portion of an accessory attachment body of the article mounting apparatus has one or more mechanical engagement members that engage one or more mating mechanical engagement members of an article for securing the article in a fixed position relative to the article mounting apparatus.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. An article mounting system, comprising:
an article including a plurality of article mounts integral therewith; and
an article mounting apparatus comprising a main body and an article attachment body, wherein the article attachment body is movably attached to the main body for enabling the article attachment body to be moved between a first use position relative to the main body and a second use position relative to the main body, wherein the article attachment body includes at least one retention member engageable with at least one mating retention member of any of the article mounts to enable the article to be releasably retained in a selected one of a plurality of available mounting positions relative to the article attachment body, wherein each of the article mounts is located at a different respective location on the article thereby enabling the article to be engaged with the article attachment body in a plurality of different positions with respect to the main body, wherein the article attachment body includes an electrical connector integral therewith and accessible at an accessory item engagement surface of the article attachment body, wherein each of the article mounts includes a mating electrical connector integral therewith and accessible at a mounting body engagement surface thereof, and wherein the electrical connector of the article attachment body, the mating electrical connector of each of the article mounts, the at least one retention member of the article attachment body, and the at least one mating retention member of each of the article mounts are jointly configured for causing the electrical connector of the article attachment body to become operably engaged with the mating electrical connector of an engaged one of the article mounts when the at least one retention member of the article attachment body becomes engaged with the at least one mating retention member of the engaged one of the article mounts.

2. The article mounting system of claim 1 wherein:
each article mount comprises a plurality of mating retention members spaced around a central point therebetween;
each of the mating retention members of a respective one of the article mounts is angularly spaced away from each adjacent one of the mating retention members thereof by one of 90 degrees and 180 degrees; and
the mating electrical connector of a respective one of the article mounts is located one of adjacent to the plurality of mating retention members thereof and centrally between the plurality of mating retention members thereof on the central point thereof.

3. The article mounting system of claim 1 wherein: each article mount comprises a plurality of mating retention members spaced around a central point therebetween; the mating electrical connector of a respective one of the article mounts is located one of adjacent to the plurality of mating retention members thereof and centrally between the plurality of mating retention members thereof on the central point thereof.

4. The article mounting system of claim 3 wherein each of the retention members: has the same shape as each other one of the retention members; and is spaced away from a central point by the same distance.

5. The article mounting system of claim 1 wherein the central point of at least two of the article mounts is located equidistance from an exterior edge of the article.

6. The article mounting system of claim 1 wherein:
each of the article mounts comprises a plurality of mating retention members;
the article attachment body comprises a plurality of retention members; and
the retention members of the article attachment body are engageable with the mating retention members of each of the article mounts.

7. The article mounting system of claim 6 wherein:
the retention members of the article attachment body are uniformly spaced around a central point therebetween; and
the mating retention members of the each of the article mounts are uniformly spaced around a central point therebetween.

8. The article mounting system of claim 7 wherein:
the electrical connector of the article attachment body is on the central point thereof; and
the mating electrical connector of a respective one of the article mounts is on the central point thereof.

9. The article mounting system of claim 8 wherein the central point of at least two of the article mounts is located equidistance from an exterior edge of the article.

10. The article mounting system of claim 7 wherein each of the retention members:
has the same shape as each other one of the retention members; and
is spaced away from the central point by the same distance.

11. The article mounting system of claim 7 wherein the central point of at least two of the article mounts is located equidistance from an exterior edge of the article.

12. An article mounting system, comprising: an article including a plurality of article mounts integral therewith; and an article mounting apparatus comprising a main body and an article attachment body, wherein the article attachment body is movably attached to the main body for enabling the article attachment body to be moved between a first use position relative to the main body and a second use position relative to the main body, wherein the article attachment body includes a plurality of retention members engageable with a plurality of mating retention members of any of the article mounts to enable the article to be releasably retained in a selected one of a plurality of available mounting positions relative to the article attachment body, wherein the mating retention members of each of the article mounts are spaced around a central point therebetween and wherein the central point of at least two of the article mounts is located equidistance from an exterior edge of the article.

13. The article mounting system of claim 1 wherein the article attachment body overlays a rear surface of the main body when in the first use position.

14. The article mounting system of claim 13 wherein: each article mount comprises a plurality of mating retention members spaced around a central point therebetween; the mating electrical connector of a respective one of the article mounts is located one of adjacent to the plurality of mating retention members thereof and centrally between the plurality of mating retention members thereof on the central point thereof.

15. The article mounting system of claim 13 wherein:
each of the article mounts comprises a plurality of mating retention members;
the article attachment body comprises a plurality of retention members; and the retention members of the article attachment body are engageable with the mating retention members of each of the article mounts.

16. The article mounting system of claim 15 wherein:
the retention members of the article attachment body are uniformly spaced around a central point therebetween; and
the mating retention members of the each of the article mounts are uniformly spaced around a central point therebetween.

17. The article mounting system of claim 16 wherein:
the electrical connector of the article attachment body is on the central point thereof; and
the mating electrical connector of a respective one of the article mounts is on the central point thereof.

18. The article mounting system of claim 17 wherein the central point of at least two of the article mounts is located equidistance from an exterior edge of the article.

19. The article mounting system of claim 12 wherein each of the retention members: has the same shape as each other one of the retention members; and is spaced away from a central point by the same distance.

20. The article mounting system of claim 12 wherein each of the retention members of the article attachment body is angularly spaced away from each adjacent one of the retention members of the article attachment body by one of 90 degrees and 180 degrees.

21. The article mounting system of claim 12 wherein: each of the mating retention members of a respective one of the article mounts is angularly spaced away from each adjacent one of the mating retention members by one of 90 degrees and 180 degrees; each article mount has an electrical connector associated therewith; the electrical connector of a respective one of the article mounts is located centrally between the mating retention members thereof on the central point thereof; and the electrical connector of the article attachment body become operably engaged with the mating electrical connector of an engaged one of the article mounts when the retention members of the article attachment body become engaged with the mating retention members of the engaged one of the article mounts.

22. The article mounting system of claim 12 wherein the article attachment body overlays a rear surface of the main body when in the first use position.

23. The article mounting system of claim 22 wherein each of the retention members of the article attachment body is angularly spaced away from each adjacent one of the retention members of the article attachment body by one of 90 degrees and 180 degrees.

24. The article mounting system of claim 12 wherein:
the main body includes opposing support article engagement bodies and a central body located therebetween;
each of the support article engagement bodies are moveably attached to the central body for enabling each of the support article engagement bodies to be moved between a respective fully retracted position relative to the center body and a respective fully displaced position relative to the center body; and
each of the opposing support article engagement bodies are independently biased to the respective fully retracted position thereof.

25. The article mounting system of claim 24 wherein:
each of the opposing support article engagement bodies translate along a longitudinal reference axis; and
the article attachment body being movably attached to the main body includes the article attachment body being pivotably attached to the main body for being pivoted about an axis of rotation extending perpendicular to the longitudinal reference axis.

26. The article mounting system of claim 24 wherein:
each of the support article engagement bodies includes one of spaced-apart protruding engagement elements and spaced-apart recessed engagement elements;
the central body includes opposing flanges that each include the other one of the spaced-apart protruding engagement elements and the spaced-apart recessed engagement elements; and
each of the protruding engagement elements is matingly and slideably engaged with a respective one of the recessed engagement elements.

* * * * *